United States Patent
Hentschel et al.

(10) Patent No.: US 6,947,098 B2
(45) Date of Patent: Sep. 20, 2005

(54) VIDEO SIGNAL PROCESSING

(75) Inventors: Christian Hentschel, Eindhoven (NL); Robert Jan Schutten, Eindhoven (NL); Abraham Karel Riemens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 837 days.

(21) Appl. No.: 09/989,247

(22) Filed: Nov. 20, 2001

(65) Prior Publication Data

US 2002/0101544 A1 Aug. 1, 2002

(30) Foreign Application Priority Data

Nov. 22, 2000 (EP) .............................................. 00204126

(51) Int. Cl.⁷ ................................................. H04N 5/21
(52) U.S. Cl. ....................... 348/631; 348/607; 348/630; 348/674
(58) Field of Search ................................ 348/630–631, 348/618, 607, 675, 674, 624, 683, 687; 382/264, 275, 238, 239

(56) References Cited

U.S. PATENT DOCUMENTS

| | | | | |
|---|---|---|---|---|
| 4,953,032 A | * | 8/1990 | Suzaki et al. ............... | 348/722 |
| 5,099,329 A | * | 3/1992 | Oyama et al. ............... | 348/620 |
| 5,144,434 A | * | 9/1992 | Yamashita et al. ........... | 348/613 |
| 5,457,494 A | * | 10/1995 | Suga et al. ............... | 348/229.1 |
| 5,663,763 A | | 9/1997 | Yagasaki et al. ............ | 348/405 |
| 6,021,216 A | * | 2/2000 | Sathe et al. ................ | 382/166 |
| 6,285,411 B1 | * | 9/2001 | Hentschel .................... | 348/607 |
| 6,507,372 B1 | * | 1/2003 | Kim .......................... | 348/630 |

FOREIGN PATENT DOCUMENTS

| | | | |
|---|---|---|---|
| EP | 0579224 | 11/1998 | ............ H04N/1/46 |
| JP | 620252292 | 4/1986 | ............ H04N/9/68 |
| JP | 630003588 | 6/1986 | .......... H04N/7/133 |
| JP | 620283776 | 12/1987 | ............ H04N/1/41 |
| JP | 602450790 | 2/1993 | ............ H04N/1/41 |
| JP | 60090351 | 3/1994 | ............ H04N/1/40 |
| WO | WO9836573 | 8/1998 | ............ H04N/7/30 |

* cited by examiner

*Primary Examiner*—John Miller
*Assistant Examiner*—Trang U. Tran

(57) ABSTRACT

A control signal (k_lum) derived from the luminance component (Y) of a video signal is used to adaptively control a temporal noise reduction filter (10) according to the level of motion in a video image. To compress the control signal for storage in a memory (30), the control signal is averaged over each 2×2 pixel area, and then a non-linear compression function is applied. The non-linear compression function preferably selects quantization values of the control signal which correspond to a perceptually substantially linear response in the noise reduction factor (NRF) of the noise filter (10).

6 Claims, 1 Drawing Sheet

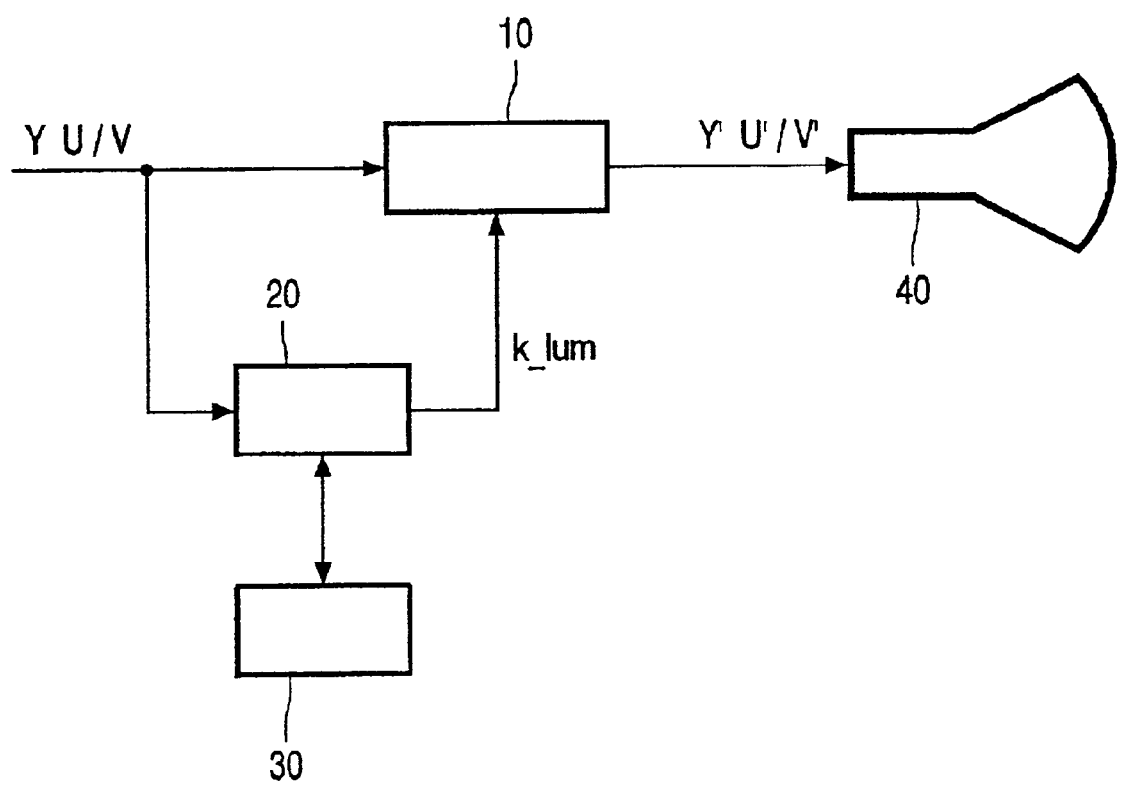

VIDEO SIGNAL PROCESSING

FIELD OF THE INVENTION

The present invention relates to a method and apparatus for video signal processing. Also, the present invention relates to a display apparatus comprising such a video signal processing apparatus.

BACKGROUND OF THE INVENTION

In one example form of video signal processing, a noise reduction function is applied to reduce noise in a video signal. Noise reduction processing can be applied in a sequential order, first to a luminance component of the video signal, and then to chrominance components of the video signal. Conveniently, the same noise reduction circuit is used for both the luminance and chrominance components of the video signal. Optionally, in luminance controlled processing, a control signal is derived from the luminance component and written to a background memory during processing of the luminance component, and read from the background memory for use during the subsequent processing of the chrominance components. This luminance-derived control signal can also be used in other forms of video signal processing. A problem arises in that storage of the control signal involves a relatively large quantity of data. For example, in a typical prior art system the luminance-derived noise reduction control signal has a quantization of seven bits, such that one byte of data storage is required for each pixel in the video signal.

SUMMARY OF THE INVENTION

It is an object of the present invention to provide an improved video signal processing. To this end, the invention provides a method and apparatus for compression of a luminance-derived control signal wherein the quantity of data is reduced. It is a further aspect of the present invention to provide a method and apparatus for video signal processing, wherein a luminance-derived control signal is compressed. The invention is defined in the independent claims. Advantageous embodiments are defined in the dependent claims.

According to a first aspect of the present invention there is provided a method and device for compression of a luminance-derived control signal for use in a video signal processing circuit, comprising quantizing the luminance-derived control signal using a non-linear compression function.

Preferably, the method is for use in a video signal noise reduction circuit. Preferably, the quantized luminance-derived control signal produces a substantially linear perceptual change in a noise reduction factor of the noise reduction circuit. Preferably, the non-linear compression function is applied such that any one-step difference in the quantization level of the luminance-derived control signal produces a substantially constant perceptual step change in a noise reduction factor of the noise reduction circuit. Preferably, the non-linear compression function is applied such that any one-step change in the luminance-derived control signal between quantization levels produces a substantially equal change in the noise reduction factor of the noise reduction circuit, when expressed in dB. For example, it is desired that a step change in the noise reduction factor differs by no greater than about 50%, preferably no greater than about 25% and ideally no greater than about 10%. That is, the magnitude of the largest and smallest step changes preferably differ by no more than about 10%.

Preferably, the non-linear compression function is determined by the steps of (a) determining a desired range of noise reduction factors to be applied by a noise reduction circuit; (b) dividing the range into a predetermined number of substantially equal steps, and (c) calculating a set of values of a luminance-derived control signal appropriate to each step as a set of quantization threshold values. By experience, a noise reduction factor range of zero to about 12 dB has been found to be particularly acceptable, given the properties of the human visual system. Suitably, the range is divided into 16 discrete steps, such that the luminance-derived control signal is conveniently quantized to 4 bits. However, any suitable range and any suitable number of steps may be chosen.

Preferably, the method also comprises the step of averaging the luminance-derived control signal over a predetermined pixel area. The luminance-derived control signal represents the amount of temporal changes in the video signal at the current image position at high detail level. Advantageously, it has been found that the human visual system has a relatively low sensitivity to the level of detail in the chrominance components of the video signal, compared with sensitivity to detail in the luminance component. Therefore, the luminance-derived control signal is preferably applied on a pixel by pixel basis to the luminance component. However, the average of the luminance-derived control signal is determined over a predetermined area, for use when processing the chrominance components, due to the lower sensitivity. In one perfferred embodiment, the luminance-derived control signal is averaged over a 2×2 pixel area, reducing data storage requirements by a factor of 4.

Preferred features of the method and apparatus of the present invention will be apparent from the statements above and the description which follows.

BRIEF DESCRIPTION OF THE DRAWINGS

For a better understanding of the invention, and to show how embodiments of the same may be carried into effect, reference will now be made, by way of example, to the accompanying diagrammatic drawing which shows a schematic overview of a display apparatus comprising a video signal processing circuit employed in a preferred embodiment of the present invention.

DESCRIPTION OF PREFERRED EMBODIMENTS

Referring to the drawing, it is desired to remove noise from a video signal using a noise filter 10. Suitably, the noise filter 10 is a recursive filter. The filter circuit 10 operates sequentially on a luminance component (Y) and then the chrominance components (U/V) of a video signal to produce respective noise filtered signals Y' and U'/V'. The noise filter 10 is controlled by a control circuit 20. The control circuit 20 determines the level of noise reduction applied by noise filter 10. The level of noise filtering applied by noise filter 10 is adapted according to the level of motion in the video signal. For example, it is desired to reduce noise filtering applied to areas of the video signal having motion, in order to preserve image quality and avoid introducing additional artefacts like motion blur. By contrast, it is desired to increase noise filtering in areas of the image having relatively low motion. Therefore, the control circuit 20 generates a control signal (k_lum) derived from the luminance component (Y) representing the level of temporal changes at a particular position in the image. The control signal is often referred to as motion detection signal or a luminance-derived noise reduction control signal. The control signal (k_lum) is used immediately for luminance processing, and is stored in a background memory 30 for the sequential chrominance processing. The output signal of the noise filter 30 is displayed on a display 40.

A preferred video signal processing method comprises, a step of deriving a control signal k_lum from the luminance component, a step of controlling a noise reduction function applied to the luminance component, a step of storing the control signal, and a step of controlling a noise reduction function applied to the chrominance components. The method also includes a step of compressing the luminance-derived control signal such that the quantity of data to be stored is reduced. The compression step will now be described in more detail.

The control signal k_lum is preferably derived for each pixel of an image in the video signal such that a full control is available when signal processing the luminance component. However, the control signal is compressed prior to storage to reduce the quantity of data to be stored. A first compression step comprises averaging the control signal k_lum over a predetermined pixel area. In the preferred embodiment the control signal is averaged over 2×2 luminance pixels (i.e. 2 pixels in one row and 2 pixels in the next row). This preferred embodiment assumes a 4:2:2 YUV color format. However, any suitable pixel area can be chosen. The second compression step comprises applying a non-linear compression function to the averaged control signal.

Typically, the not yet compressed control signal k_lum has a quantization of 7 bits, in order to provide granularity of control appropriate to the perceptual qualities of the human visual system. However, it is most convenient to store data in the background memory in either 4 bits or 8 bits. The standard 7 bit quantization of the control signal k_lum therefore requires 1 byte of data per pixel. One option is to reduce the quantization of the control signal k_lum to, for example, use 4 bits. Unfortunately, a linear quantization to 4 bits has been found to be insufficient for a smooth fading for the recursive noise reduction filter function. To illustrate, an analysis can be done by calculating the noise reduction factor (NRF) dependent on the control signal k. The NRF for a recursive loop of first order can be calculated to:

$$NRF = 10 \cdot \log\left(\frac{2}{k} - 1\right)[dB] \quad (1)$$

The NRF is preferably quoted in dB to give a more proportional perception of the human visual system. Taking a 4-bit quantized control signal k, the noise reduction factor at each quantization level can be calculated as set forth in table 1 below.

TABLE 1

| control signal (k) | NRF [dB] |
|---|---|
| 1 | 0 |
| 15/16 | 0.54 |
| 14/16 | 1.1 |
| 13/16 | 1.6 |
| 12/16 | 2.2 |

TABLE 1-continued

| control signal (k) | NRF [dB] |
|---|---|
| 11/16 | 2.8 |
| 10/16 | 3.4 |
| 9/16 | 4.1 |
| 8/16 | 4.8 |
| 7/16 | 5.5 |
| 6/16 | 6.4 |
| 5/16 | 7.3 |
| 4/16 | 8.5 |
| 3/16 | 9.9 |
| 2/16 | 11.8 |
| 1/16 | 14.9 |

As shown in Table 1, the linear quantized k-values cause a non-linear behaviour of the noise reduction factor. At high k-values there is a relatively small change in the noise reduction factor between levels. For example, the difference from 1 to $^{15}/_{16}$ results in a noise reduction difference of 0.54 dB. However, at low k-values there is a large change in the NRF. For example, the difference from $^{2}/_{16}$ to $^{1}/_{16}$ results in a noise reduction difference of 3.1 dB. Especially for high noise reduction factors, switching between two levels can cause unwanted additional artefacts. That is, a change in noise reduction factor of the order of 3 dB results in poor visual perception of the noise-filtered image.

We will now describe a preferred method for determining a non-linear compression function applied to the control signal. The first step comprises determining a desired range of the noise reduction factor. By experience, it has been found that a maximum NRF of around 12 dB is sufficient. The second step comprises dividing the NRF range into substantially equal portions. In the preferred embodiment the NRF range is divided into 16 portions corresponding to a 4-bit quantization. The NRF range is divided such that the noise reduction factor follows a substantially linear behavior. With a NRF range of about 12 dB, a 4-bit quantization allows for switching steps of around 0.8 dB over the entire range. By taking the reverse of Equation 1 above for the desired NRF values, the corresponding k-values can be calculated according to Equation 2:

$$k = \frac{2}{1 + 10^{\frac{NRF[dB]}{10}}} \quad (2)$$

The calculation of the k-values is algorithm dependent, and therefore should be calculated as the reverse of the NRF equation. Taking the preferred example situation, a 4-bit quantization over a NRF range of 12 dB leads to the k-values as set out in Table 2 below:

TABLE 2

| NRF [dB] | k |
|---|---|
| 0 | 1 |
| 0.8 | 0.9082 |
| 1.6 | 0.8178 |
| 2.4 | 0.7305 |
| 3.2 | 0.6474 |
| 4.0 | 0.5695 |
| 4.8 | 0.4975 |
| 5.6 | 0.4319 |
| 6.4 | 0.3728 |
| 7.2 | 0.3201 |
| 8.0 | 0.2736 |
| 8.8 | 0.2329 |

TABLE 2-continued

| NRF [dB] | k |
|---|---|
| 9.6 | 0.1976 |
| 10.4 | 0.1672 |
| 11.2 | 0.1410 |
| 12.0 | 0.1187 |

The step difference in k-value changes over the range of NRF values. At low NRF values for example between 0 and 0.8 dB, k changes by 0.0918, whereas at high NRF values such as between NRF=11.2 dB and 12 dB, the step difference in the k-value is $\delta_k=0.0223$. The equivalent total number of quantization steps (in a linear quantization) becomes $1/\delta_k=45$, which corresponds to a virtual quantization of 5.5 bits. Therefore, the non-linear compression function allows a greater virtual quantization than a straightforward linear quantization, thereby reducing memory storage requirements whilst preserving good perceptual quality of the video signal image.

A method an apparatus have been described which enable compression of a control signal that is applied during processing of a video signal. Advantageously, memory storage requirements are reduced, leading to reduced hardware costs and faster signal processing. Also, a video signal processing method and apparatus have been described which take advantage of the compression method and apparatus. The preferred embodiment of the invention has been described using the example of a noise reduction circuit, but the invention is applicable to compression of a luminance-derived control signal used in many other forms of video signal processing.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitable programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A video signal processing method, comprising:
   deriving a first control signal from a luminance component of a video signal;
   applying a noise reduction function controlled by the first control signal;
   compressing the first control signal using a non-linear compression function to produce a second control signal;
   storing the second control signal in a memory; and
   applying a noise reduction function to chrominance component of the video signal based upon the stored second control signal.

2. A video signal processing method according to claim 1, wherein the compressing step comprises applying a non-linear compression function such that the second control signal produces a substantially linear perceptual change in a noise reduction factor applied to the chrominance component.

3. A video signal processing method according to claim 1, wherein the non-linear compression function is determined by:
   determining a desired range of noise reduction factors to be applied by a noise reduction circuit;
   dividing the range into a predetermined number of substantially equal steps; and
   calculating a set of values of a luminance-derived control signal appropriate to each step as a set of quantization threshold values.

4. A video signal processing method according to claim 1, wherein the calculating step comprises averaging the first control signal over a predetermined pixel area.

5. A video signal processing apparatus comprising:
   a noise filter (10) for furnishing noise-reduced signals;
   a control circuit (20) for deriving a first control signal from a luminance component of a video signal, controlling a noise reduction function applied by the noise filter (10) to a luminance component of a video signal using the first control signal, compressing the first control signal to produce a second control signal using a non-linear compression function, and controlling a noise reduction function applied by the noise filter to a chrominance component of a video signal using the second control signal; and
   a memory (30) for storing the second control signal.

6. A display apparatus, comprising:
   the video signal processing apparatus of claim 5; and
   a display device (40) for displaying the noise-reduced signals.

* * * * *